United States Patent [19]

Khosropour et al.

[11] 4,450,932
[45] May 29, 1984

[54] HEAT RECOVERY MUFFLER

[75] Inventors: Mostafa M. Khosropour, Madison; Thomas C. Learn, Stoughton, both of Wis.

[73] Assignee: Nelson Industries, Inc., Stoughton, Wis.

[21] Appl. No.: 388,430

[22] Filed: Jun. 14, 1982

[51] Int. Cl.³ .................. F16D 65/14; F16F 9/30; F16F 9/50
[52] U.S. Cl. .................. 181/211; 181/268; 181/283
[58] Field of Search .......... 181/211, 260, 268, 265, 181/272, 275, 283, 212; 165/51, 135; 60/320, 321

[56] References Cited

U.S. PATENT DOCUMENTS

| | | |
|---|---|---|
| 1,051,130 | 1/1913 | Lattime et al. |
| 1,724,559 | 8/1925 | Butler. |
| 1,745,492 | 2/1930 | Kelch et al. ............ 165/51 |
| 1,831,159 | 4/1927 | Burrows. |
| 2,397,208 | 2/1941 | Saco, Jr. et al. ............ 165/135 X |
| 2,919,540 | 2/1957 | Percival ............ 60/320 X |
| 2,966,036 | 12/1960 | Stowens ............ 62/11 |
| 3,280,903 | 10/1966 | Stoddard et al. ............ 165/135 |
| 3,404,731 | 10/1968 | Cushman ............ 165/51 |
| 3,786,896 | 1/1974 | Foster et al. ............ 181/265 |
| 4,147,230 | 4/1979 | Ormond et al. ............ 181/231 |

OTHER PUBLICATIONS

Maxim (Riley-Beaird) p. 1554.

Primary Examiner—Donald A. Griffin
Assistant Examiner—Brian W. Brown
Attorney, Agent, or Firm—Andrus, Sceales, Starke & Sawall

[57] ABSTRACT

A heat recovery muffler comprising an outer body and having an annular heat exchanger disposed within the body and spaced from the ends thereof. The heat exchanger is provided with a central opening and an exhaust gas inlet pipe is located within the central opening and spaced inwardly therefrom to provide an annular passage. The downstream end of the central opening of the heat exchanger is closed off so that the flow of exhaust gas entering the muffler body through the inlet pipe will be reversed and is directed upstream. The heat exchanger is formed with a plurality of tubes that provide communication between opposite ends of the body, and the exhaust gases, after being reversed in flow, then flow downstream through the tubes in heat exchange relation with a cooling medium, such as water, to cool the exhaust gases and heat the cooling medium. The cooled exhaust gases are discharged to the atmosphere through an outlet pipe in the downstream end of the muffler body. A spark arrestor can be incorporated in the downstream end of the body to separate carbon particles or other particulate matter from the gas being discharged through the outlet pipe.

8 Claims, 4 Drawing Figures

HEAT RECOVERY MUFFLER

BACKGROUND OF THE INVENTION

The exhaust gas being discharged from an internal combustion engine has a relatively high temperature, sometimes in the neighborhood of about 850° F. to 1200° F., and as such, in some applications cannot be discharged directly into the atmosphere without cooling. Attempts have been made in the past to incorporate heat recovery systems with an exhaust gas muffler in order to cool the exhaust gas and in some cases provide an auxiliary source of heated water. In addition, heat recovery mufflers have been used in the past to recover the energy that would be otherwise wasted in the exhaust discharge. This recovered energy can be used directly as heat or can be converted to mechanical energy to provide a supplement to the main engine drive power. The exhaust gas may also contain hot sparks from the engine which must be removed before discharge into the atmosphere.

In a heat recovery muffler, the primary objective is to effect attenuation of the sound energy and remove heat from the exhaust gas, while maintaining the exhaust gas pressure drop within the engine manufacturer's acceptable level.

SUMMARY OF THE INVENTION

The invention is directed to an improved heat recovery system for a muffler. The muffler is composed of an outer body or casing which is enclosed at one end by a lower head or closure and at the other end by an upper head. An annular heat exchanger is mounted within the body and is spaced from the end closures. The heat exchanger has a central opening and an exhaust gas inlet pipe is mounted in the lower end closure, extending within the central opening and being spaced radially inward of the heat exchanger to provide an annular passage therebetween.

The upper or downstream end of the central opening of the heat exchanger is closed off so that the exhaust gas entering the muffler body through the inlet pipe will be reversed in flow and will flow upstream through the annular passage between the inlet pipe and the heat exchanger to the lower or upstream end of the body. The exhaust gas then flows downstream through a plurality of tubes in the heat exchanger in heat exhange relation with a cooling medium, such as water, to cool the exhaust gas, or to heat the water. The cooled gas is then discharged to the atmosphere through an outlet pipe in the upper head of the muffler.

As an additional feature of the invention, a spark arrestor can be associated with the upper or downstream end of the muffler body. The spark arrestor functions to swirl the exhaust gas outwardly and cause carbon particles or heavy particulate material to be thrown outwardly by centrifugal force against an annular wall and then collected in a collection chamber.

The invention provides an improved heat recovery system for a muffler which substantially decreases the temperature of the exhaust gas being discharged from the muffler. The improved heat transfer is achieved by reversing the path of flow of the exhaust gases and then flowing the gas through a plurality of tubes in the heat exchanger. With this arrangement, the temperature of the exhaust gas, which may be in the neighborhood of about 1000° F., when it enters the muffler, is reduced to a temperature of under 400° F., where it can be freely discharged to the atmosphere.

The invention also incorporates a spark arrestor which will act to remove carbon particles and other particulate material from the exhaust gas being discharged from the muffler.

The muffler of the invention, in addition to cooling the exhaust gas, achieves an effective attenuation of the sound energy, while maintaining the pressure drop within allowable limits.

Other objects and advantages will appear in the course of the following description.

DESCRIPTION OF THE DRAWINGS

The drawings illustrate the best mode presently contemplated of carrying out the invention.

In the drawings:

FIG. 4 is a section taken along line 4—4 of FIG. 1.

DESCRIPTION OF THE ILLUSTRATED EMBODIMENT

Figure 1:
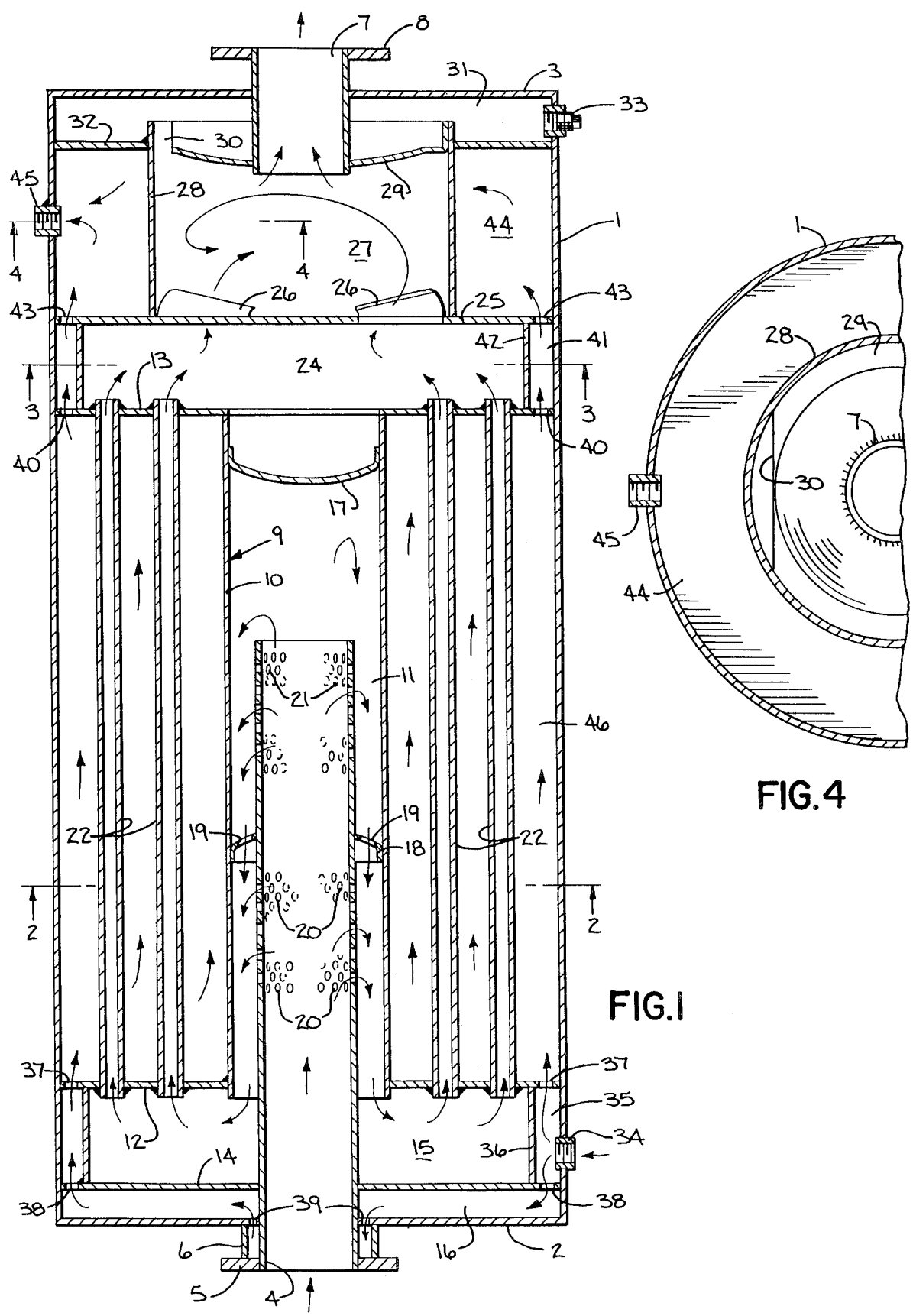
FIG. 1 is a longitudinal section of the heat recovery muffler of the invention.
Figure 2:
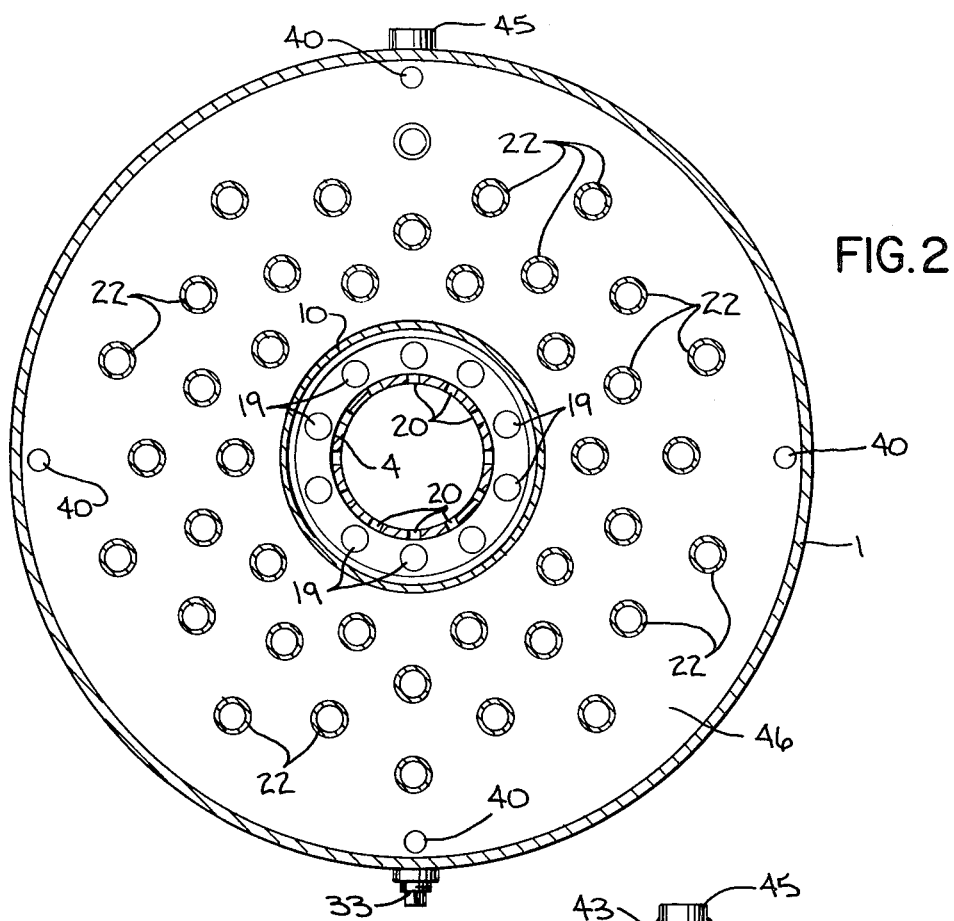
FIG. 2 is a transverse section taken along line 2—2 of FIG. 1
Figure 3:
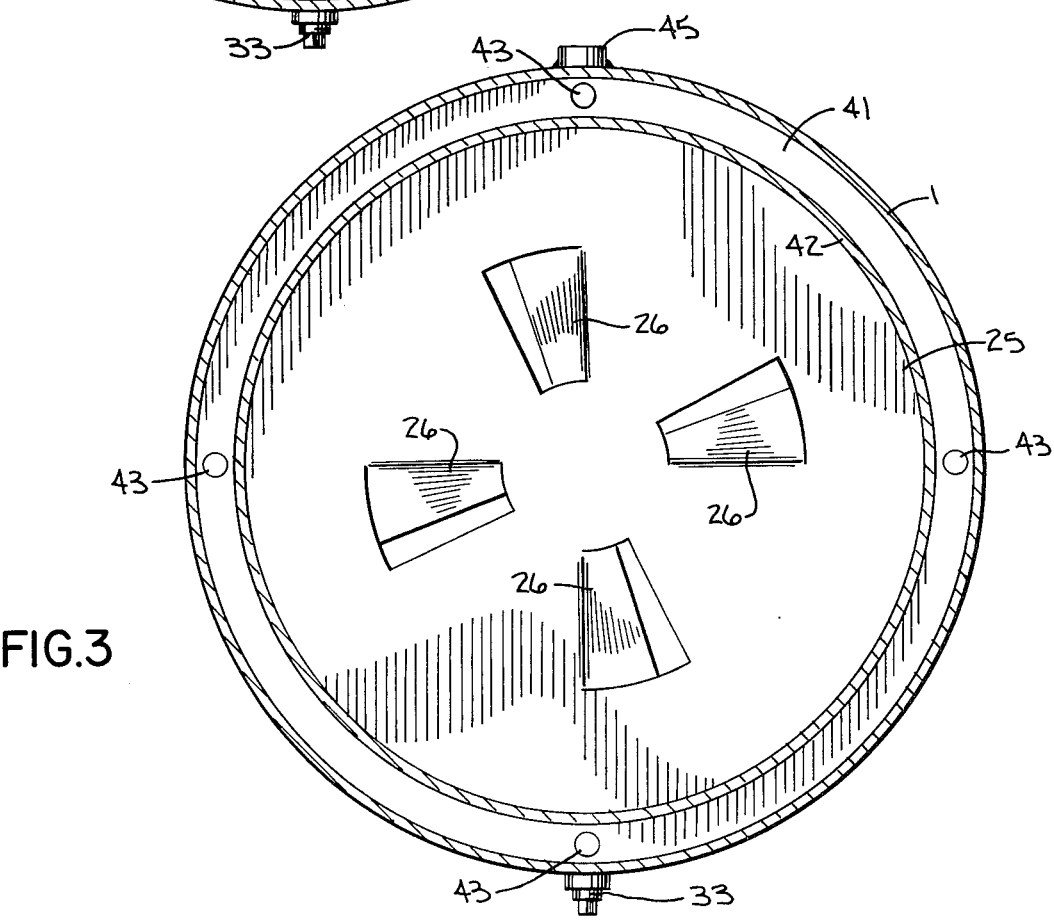
FIG. 3 is a section taken along line 3—3 of FIG. 1.

The drawings illustrate a heat recovery muffler including a generally cylindrical casing or body 1, which is enclosed at its ends by a lower end head 2 and an upper end head 3. Exhaust gas from an internal combustion engine is introduced into the muffler through an inlet pipe 4, and the outer end of pipe 4 is provided with a mounting flange 5 through which the muffler can be attached to an engine exhaust pipe, not shown. Sleeve 6 is disposed radially outward of the projecting end of inlet pipe 4 and connects flange 5 with lower end head 2, as shown in FIG. 1.

Exhaust gas is discharged from the muffler through an outlet pipe 7 which is mounted centrally of upper head 3. The outer end of outlet pipe 7 carries a mounting flange 8, similar in construction to flange 5.

Mounted within body 1 is a heat exchanger 9 which includes an inner tubular member 10 that is spaced radially outward from the inlet pipe 4 to provide an annular passage 11. Heat exchanger 9 also includes a pair of end flanges 12 and 13 which connect the respective ends of tubular member 10 to body 1. Thus, the tubular member 10, along with the flanges 12 and 13 and body 1, define a closed heat exchange unit.

As illustrated in FIG. 1, the ends of the heat exchanger are spaced from the respective end heads 2 and 3, and baffle 14 is mounted transversely of body 1 and is spaced from end flange 12 of heat exchanger 9, as well as from lower end head 2 to provide a pair of chambers 15 and 16, as shown in FIG. 1.

The upper or downstream end of the central opening in the heat exchanger 9 is closed off by an imperforate plug or closure 17, and the central portion of inlet pipe 4 is supported from tubular member 10 by an annular flange 18 having a series of holes or openings 19. The portion of inlet pipe 4 located beneath or upstream of flange 18 is provided with a group of perforations 20 and similarly the portion of inlet pipe 4 located above the baffle 18 is provided with a second group of perforations 21.

With this construction, a portion of the exhaust gas entering the muffler through inlet pipe 4 will pass outwardly through perforations 20 and 21 into the passage 11, while a second portion of the exhaust gas will be discharged from the upper or downstream end of inlet pipe 4 and will be deflected upstream by plug 17 into passage 11. The exhaust gas will then flow from passage 11 into chamber 15, as shown by the arrows in FIG. 1.

Heat exchanger 9 includes a plurality of tubes 22 which extend longitudinally and the lower ends or upstream ends of tubes 22 communicate with chamber 15, while the upper ends of tubes 22 communicate with chamber 24.

Spaced upwardly from the upper end of heat exchanger 9 is a transverse wall or partition 25 which is provided with a series of louvered openings 26. The exhaust gas flows upwardly through tubes 22 into chamber 24 and then passes through the louvered openings 26 into the upper chamber 27. The louvered openings function to swirl the gas in a generally spiral manner and heavier materials, such as carbon particles or other foreign materials, are thrown outwardly by centrifugal force against annular wall 28, which is spaced inwardly from body 1.

Baffle 29 connects the wall 28 with outlet pipe 7, and as best illustrated in FIG. 4, baffle 29 is provided with an arcuate notch 30, which provides communication between chamber 27 and end chamber 31. As illustrated in FIG. 1, chamber 31 is defined by the upper end head 3, baffle 29 and plate 32, which extends between the outer periphery of baffle 29 and body 1. Heavier particulate material, which is thrown outwardly by centrifugal force against the wall 28, passes through notch 30 into chamber 31 and is collected in the lower portion of the chamber. A clean-out opening is provided in body 1 and is enclosed by plug 33. By removing plug 33, the particulate material within chamber 31 can be removed.

A cooling medium, such as water, is supplied to the heat exchanger 9 to cool the exhaust gas which flows within the passage 11, as well as through tubes 22. To supply cooling water to the heat exchanger, an inlet 34 is provided in body 1 and is connected to a suitable supply of water or other cooling medium. Inlet 34 communicates with inlet chamber 35, which is defined by annular wall 36 and body 1. A plurality of holes 37 are formed in the end flange 12 and communicate with chamber 35, so that water entering inlet 34 can pass into the interior of the heat exchanger. In addition, baffle 14 is provided with a plurality of ports 38 which communicate with inlet chamber 35 and the water will flow through the ports into lower chamber 16. Holes 39 are provided in the end head 2 adjacent inlet pipe 4, so that water can circulate from chamber 16 into the space between the sleeve 6 and the inlet pipe.

The water is discharged from heat exchanger 9 through holes 40 into annular passage 41 which is defined by ring 42 and body 1, and from passage 41, the water flows through holes 43 into outer chamber 44, which is located outwardly of chamber 27. Connected to chamber 44 is an outlet 45 through which the heated water is discharged to a location of use or to a disposal site. With this cooling system, all portions of the muffler which are exposed to the heated exhaust gas are cooled to maintain the temperature of the muffler and the exhaust gas within accepted standards.

In operation, a portion of the exhaust gas entering inlet pipe 4 will pass outwardly through perforations 20 and 21 into annular passage 11, while a second portion of the exhaust gas will be discharged from the downstream end of inlet pipe 4, and due to the imperforate plug 17, the flow of the gas will be reversed in an upstream direction into passage 11. As the gas flows upstream within passage 11, heat is transferred from the gas to the cooling water in heat exchanger 9.

The exhaust gas from passage 11 then flows into the lower chamber 15 and then passes in a downstream direction through heat exchange tubes 22 to the upper end of the muffler. As the gas flows within the tubes 22, additional heat will be transferred to the water within the chamber 46 of heat exchanger 9.

On exiting from tubes 22, the gas flows into chamber 24 and then is swirled outwardly by louvered openings 26 into chamber 27. Additional cooling is provided for the gas within chambers 24 and 27 by virtue of the cooling water in outer chambers 41 and 44.

The particulate material in the gas will be thrown outwardly by centrifugal force against the wall 28 and will pass through the notch 30 into the collection chamber 31, while the gas will flow outwardly from the outlet tube 7.

The heat recovery muffler of the invention provides an effective attenuation of sound energy, while removing a substantial portion of the heat from the exhaust gas, and yet maintains the pressure drop of the gas within the engine manufacturer's acceptable levels.

Various modes of carrying out the invention are contemplated as being within the scope of the following claims particularly pointing out and distinctly claiming the subject matter which is regarded as the invention.

We claim:

1. A heat recovery muffler, comprising a tubular body, a first head to enclose one end of the body, a second head to enclose the other end of said body, an exhaust gas inlet conduit for introducing exhaust gas into said body and having a downstream end disposed in said body, an annular heat exchanger disposed within said body and including an inner annular tubular member disposed concentrically outward of said inlet conduit to provide an annular passage therebetween, said heat exchanger also including a first end plate extending laterally of said tubular member and spaced from said first head to define a first chamber therebetween, said heat exchanger also including a second end plate extending laterally of said tubular member and spaced from said second head to define a second chamber therebetween, the space between said plates defining a compartment, said heat exchanger also comprising a plurality of tubes extending through said compartment between said end plates and providing communication between said chambers, a closure disposed across said tubular member and spaced from the downstream end of said inlet conduit, an outlet conduit communicating with said second chamber for discharging exhaust gas from said body, and means for flowing a heat exchange medium through said compartment to cool said exhaust gas, said exhaust gas being discharged from the downstream end of said inlet conduit and then flowing in a reverse direction through said passage to said first chamber and then flowing through said tubes to the second chamber for discharge from said outlet conduit.

2. The muffler of claim 1 wherein said means for flowing a heat transfer medium comprises inlet means for introducing said heat transfer medium into one end of said compartment, and discharging means located diametrically opposite said inlet means for discharging said medium for the opposite end of said compartment.

3. The muffler of claim 1, wherein said inlet conduit has a plurality of perforations providing communication between the interior of the inlet conduit and said annular passage.

4. The muffler of claim 1, wherein said tubes are disposed in a generally circular configuration within said heat exchanger.

5. The muffler of claim 1, and including means disposed in said second chamber for swirling the exhaust gas outwardly whereby heavier particulate material will be thrown outwardly by centrifugal force, and means for collecting the particulate material in a collection chamber in said body.

6. The muffler of claim 5, wherein said means for swirling includes a transverse wall disposed in the second chamber and spaced from said opposite end of the heat exchanger, said wall having a plurality of louvered openings disposed in a circular pattern.

7. The muffler of claim 6, wherein said muffler includes a partition disposed transversely of said body and spaced between said transverse wall and said second end closure, said partition having a peripheral opening, the space between said partition and said second end closure defining said collection chamber.

8. A heat recovery muffler, comprising a tubular body, a first head to enclose one end of the body, a second head to enclose the other end of said body, an exhaust gas inlet conduit for introducing exhaust gas into said body and having a downstream end disposed in said body, an annular heat exchanger disposed within said body and including an inner annular tubular member disposed concentrically outward of said inlet conduit to provide an annular passage therebetween, said heat exchanger also including a first end plate extending laterally of said tubular member and spaced from said first head to define a first chamber therebetween, said heat exchanger also including a second end plate extending laterally of said tubular member and spaced from said second head to define a second chamber therebetween, the space between said plates defining a compartment, said heat exchanger also comprising a plurality of tubes extending through said compartment between said end plates and providing communication between said chambers, a closure disposed across said tubular member and spaced from the downstream end of said inlet conduit, an outlet conduit communicating with said second chamber for discharging exhaust gas from said body, said inlet conduit having a plurality of perforations providing communication between the interior of the inlet conduit and said annular passage whereby said exhaust gas flows directly through said perforations into contact with said tubular member, and means for flowing a heat exchange medium through said compartment to cool said exhaust gas, said exhaust gas being discharged from the downstream end of said inlet conduit and then flowing in a reverse direction through said passage to said first chamber and then flowing through said tubes to the second chamber for discharge from said outlet conduit.

* * * * *